(12) United States Patent
Stronge

(10) Patent No.: US 10,754,575 B2
(45) Date of Patent: Aug. 25, 2020

(54) STORAGE SYSTEM WITH REPLICATION PROCESS UTILIZING SIMULATED TARGET RESPONSES

(71) Applicant: EMC IP Holding Company LLC, Hopkinton, MA (US)

(72) Inventor: William R. Stronge, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 130 days.

(21) Appl. No.: 16/036,195

(22) Filed: Jul. 16, 2018

(65) Prior Publication Data

US 2020/0019317 A1 Jan. 16, 2020

(51) Int. Cl.
*G06F 3/06* (2006.01)
*H04L 12/26* (2006.01)

(52) U.S. Cl.
CPC ............ *G06F 3/065* (2013.01); *G06F 3/067* (2013.01); *G06F 3/0617* (2013.01);
(Continued)

(58) Field of Classification Search
CPC ...... G06F 3/065; G06F 3/0617; G06F 3/0641; G06F 3/0658; G06F 3/067; G06F 3/0614;
(Continued)

(56) References Cited

U.S. PATENT DOCUMENTS 7,444,464 B2 10/2008 Urmston et al.
8,095,726 B1 1/2012 O'Connell et al.
(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Michael Krofcheck
(74) *Attorney, Agent, or Firm* — Ryan, Mason & Lewis, LLP

(57) ABSTRACT

A storage system in one embodiment comprises a plurality of storage devices and a storage controller. The storage system is configured to operate as a source storage system in a replication process in which participation of a target storage system is simulated. In conjunction with the replication process, the source storage system is configured to monitor outbound replication messages, and responsive to a given one of the replication messages being designated for transmission over a particular communication link of a predetermined type, to generate a simulated response from the target storage system to the given replication message based at least in part on one or more simulation parameters specified for the replication process. The source storage system then processes the simulated response as if it were an actual response from the target storage system. The particular communication link of a predetermined type illustratively comprises a pseudo IP link.

20 Claims, 6 Drawing Sheets

(52) U.S. Cl.
CPC .......... *G06F 3/0641* (2013.01); *G06F 3/0658* (2013.01); *H04L 43/0864* (2013.01)

(58) Field of Classification Search
CPC .... G06F 3/0626; G06F 3/0646; G06F 3/0659; G06F 3/0662; G06F 3/0664; G06F 11/2056; G06F 11/1402; H04L 43/0864
See application file for complete search history.

(56) References Cited

U.S. PATENT DOCUMENTS

| | | | | |
|---|---|---|---|---|
| 8,209,680 | B1* | 6/2012 | Le | G06F 9/45558 717/174 |
| 8,214,612 | B1 | 7/2012 | Natanzon | |
| 9,104,326 | B2 | 8/2015 | Frank et al. | |
| 9,110,898 | B1* | 8/2015 | Chamness | G06F 11/2066 |
| 9,208,162 | B1 | 12/2015 | Hallak et al. | |
| 9,286,003 | B1 | 3/2016 | Hallak et al. | |
| 9,606,870 | B1 | 3/2017 | Meiri et al. | |
| 9,716,754 | B2 | 7/2017 | Swift | |
| 10,509,667 | B1* | 12/2019 | Popuri | G06F 9/45558 |
| 2003/0177179 | A1* | 9/2003 | Jones | H04L 29/06 709/203 |
| 2004/0225659 | A1* | 11/2004 | O'Brien | G06F 16/1824 |
| 2004/0254777 | A1* | 12/2004 | Foreman | G06F 11/261 703/21 |
| 2006/0100842 | A1* | 5/2006 | Dominguez | G06F 11/3672 703/20 |
| 2007/0067151 | A1* | 3/2007 | Fiedler | G06F 8/20 703/25 |
| 2008/0232263 | A1* | 9/2008 | Lesser | H04L 43/0864 370/252 |
| 2008/0279462 | A1 | 11/2008 | Celi, Jr. | |
| 2009/0132955 | A1 | 5/2009 | Garg et al. | |
| 2009/0281783 | A1* | 11/2009 | Bitar | G06F 11/3457 703/21 |
| 2010/0179941 | A1 | 7/2010 | Agrawal et al. | |
| 2013/0325824 | A1 | 12/2013 | Shoens | |
| 2014/0181016 | A1 | 6/2014 | Whitehead et al. | |
| 2015/0032696 | A1* | 1/2015 | Camble | G06F 11/1456 707/634 |
| 2016/0150012 | A1 | 5/2016 | Barszczak et al. | |
| 2016/0170987 | A1 | 6/2016 | Kesselman | |
| 2016/0202927 | A1 | 7/2016 | Klarakis et al. | |
| 2016/0224259 | A1 | 8/2016 | Ahrens et al. | |
| 2019/0163586 | A1* | 5/2019 | McBride | G06F 3/0647 |
| 2019/0205055 | A1* | 7/2019 | Narayanam | G06F 3/0641 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

U.S. Appl. No. 15/662,809 filed in the name of William Stronge et al. filed Jul. 28, 2017 and entitled "Automatic Verification of Asynchronously Replicated Data."

U.S. Appl. No. 15/819,666 filed in the name of Xiangping Chen et al. filed Nov. 21, 2017 and entitled "Storage System Configured for Controlled Transition Between Asynchronous and Synchronous Replication Modes."

* cited by examiner

Simulation parameters:

1. RPO – Desired recover point objective for replication process
2. Network RTT – Expected round-trip network delay between source and target (e.g., obtained from network provider)
3. Target processing time:
    a. Average write latency of target
    b. Default average (e.g., 1 msec)
    c. Estimate for target array type
4. Deduplication factor – Expected deduplication ratio for replicated data on the target:
    a. Source deduplication factor
    b. Deduplication factor of storage volumes being replicated (if available)
    c. Estimate for target array type
5. Maximum bandwidth:
    a. Bandwidth of one or more new network connections to be set up for the replication process
    b. Maximum amount of bandwidth the replication data should consume in one or more existing network connections

FIG. 3

STORAGE SYSTEM WITH REPLICATION PROCESS UTILIZING SIMULATED TARGET RESPONSES

FIELD

The field relates generally to information processing systems, and more particularly to storage in information processing systems.

BACKGROUND

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Source site and target site storage systems can therefore each be configured to support both asynchronous and synchronous replication modes.

Conventional approaches to data replication can be problematic under certain conditions. For example, when estimating the recover point objective or other benefits achievable through a proposed replication process in a source storage system, it is usually necessary to implement the replication process utilizing an actual target storage system with actual network bandwidth resources deployed between the source and target. This unduly increases the complexity and expense associated with assessing the recover point objectives or other benefits achievable in various replication scenarios.

SUMMARY

Illustrative embodiments include techniques for configuring a storage system to operate as a source storage system in a replication process in which participation of a target storage system is simulated. One or more of these embodiments allow a particular source storage system and target storage system replication arrangement to be accurately and efficiently simulated without the need to allocate actual network bandwidth resources for the replication process and without the need for any additional storage system to operate as the target storage system relative to the source storage system. The complexity and expense associated with reliably assessing multiple distinct replication scenarios for a given storage system using actual production applications and storage volumes can therefore be considerably reduced. As a result, these embodiments are better able to configure an actual replication process in a manner that is able to achieve a desired recover point objective.

In one embodiment, an apparatus comprises a storage system that includes a plurality of storage devices and a storage controller. The storage system is configured to operate as a source storage system in a replication process in which participation of a target storage system is simulated. In conjunction with the replication process, the source storage system is configured to monitor outbound replication messages, and responsive to a given one of the replication messages being designated for transmission over a particular communication link of a predetermined type, to generate a simulated response from the target storage system to the given replication message based at least in part on one or more simulation parameters specified for the replication process. The source storage system then processes the simulated response as if it were an actual response from the target storage system.

The replication process is configured to designate one or more storage volumes of the source storage system for replication. The replication process in illustrative embodiments therefore utilizes one or more actual production storage volumes utilized by one or more production applications.

The one or more simulation parameters specified for the replication process illustratively comprise at least one of a recover point objective, a network round trip time between the source and target storage systems, a target storage system processing time, and a maximum bandwidth for the replication process.

Additional or alternative simulation parameters may be taken into account. For example, in some embodiments, the simulation parameters specified for the replication process may comprise at least one of a deduplication factor for one or more storage volumes of the source storage system that are designated for replication, and a compression factor for the one or more designated storage volumes.

The particular communication link of a predetermined type illustratively comprises a pseudo link of the source storage system. The pseudo link in some embodiments does not have a corresponding route in a routing table of the source storage system and/or is not connected to a network port of the source storage system. In some embodiments, the pseudo link comprises a pseudo Internet Protocol link that is configured with a delay setting based at least in part on at least one of the one or more simulation parameters. For example, the delay setting of the pseudo link is illustratively determined as a function of at least a specified network round trip time and a specified target storage system processing time.

In some embodiments, generating a simulated response from the target storage system to the given replication message based at least in part on one or more simulation parameters specified for the replication process comprises generating the simulated response after a response delay determined based at least in part on a delay setting established for the particular communication link of the predetermined type.

As indicated above, the delay setting established for the particular communication link of the predetermined type may be determined as a function of a network round trip time and a target storage system processing time.

In some embodiments, generating the simulated response after a response delay determined based at least in part on a delay setting established for the particular communication link of the predetermined type comprises placing a message sending thread of the given replication message into a sleep state for a particular amount of time that is determined based at least in part on the delay setting. The message sending thread is configured to create the simulated response in conjunction with exiting the sleep state.

The source storage system in some embodiments is configured to generate one or more results of the replication process including at least an indication as to whether or not a particular recover point objective is achieved by the replication process.

The illustrative embodiments include a clustered implementation of a storage system having a distributed storage controller that is distributed over multiple nodes of the clustered storage system. Similar advantages can be provided in other types of storage systems. For example, the storage system in some embodiments comprises a content addressable storage system having one or more sets of non-volatile memory storage devices. The storage devices of the storage system in such embodiments can comprise flash memory storage devices configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIG. 3 shows example simulation parameters for a replication process utilizing simulated target responses in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
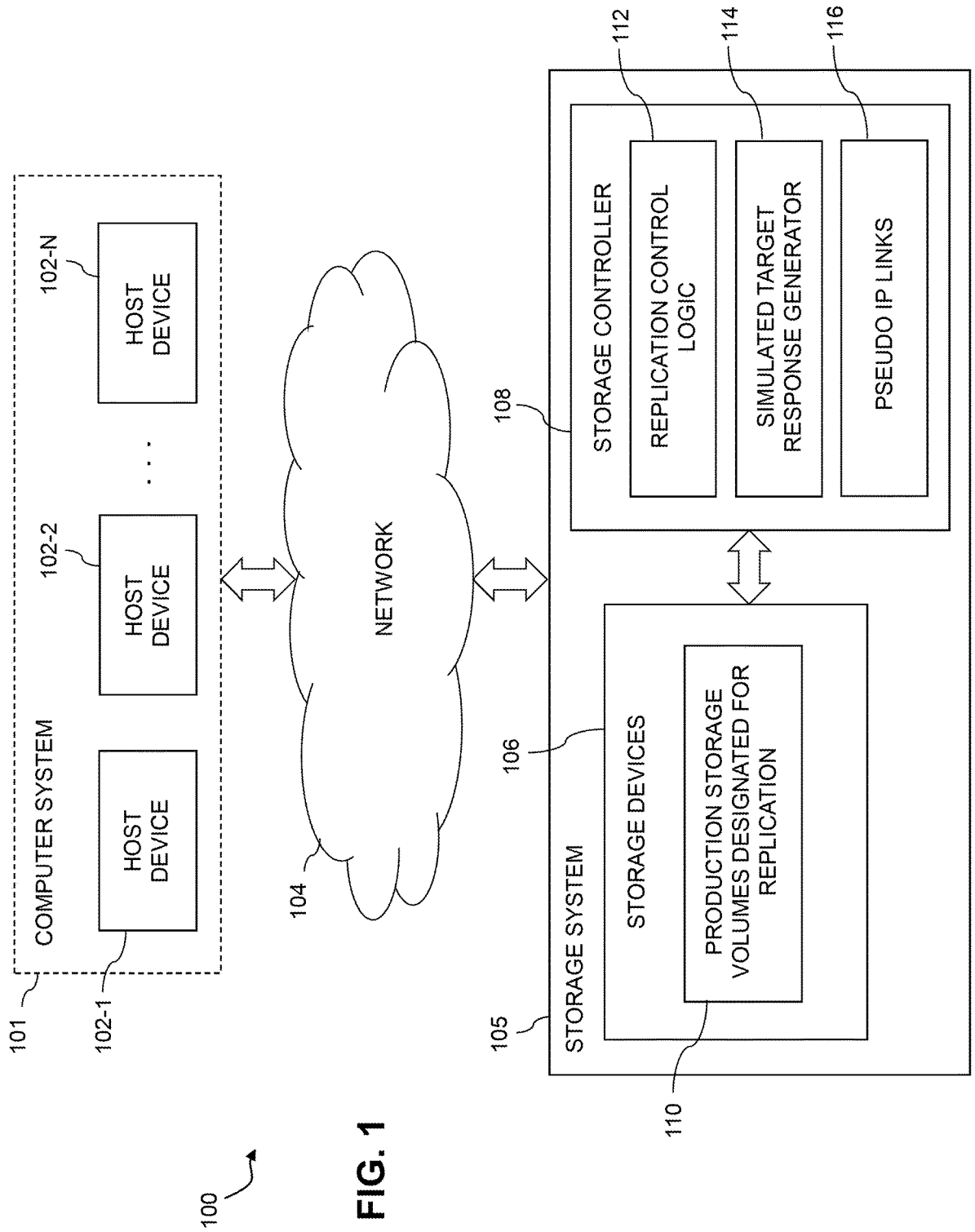
FIG. 1 is a block diagram of an information processing system comprising a storage system configured to perform a replication process utilizing simulated target responses in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 are configured to store data of a plurality of storage volumes 110 under the control of the storage controller 108. The storage volumes 110 illustratively comprise production storage volumes designated for replication. The storage devices 106 can store other types of datasets, including additional or alternative logical storage volumes, snapshots or other arrangements of data.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes replication control logic 112, a simulated target response generator 114, and a plurality of pseudo IP links 116.

The storage controller 108 and storage system 105 should also be understood to include additional modules and other components typically found in conventional implementations of storage controllers and storage systems, although such additional modules and other components are omitted from the figure for clarity and simplicity of illustration.

The storage controller 108 via its replication control logic 112 is configured to operate as a source storage system in a replication process in which participation of a target storage system is simulated. The replication process in the present embodiment is substantially the same as an actual replication process that would be initiated in the source storage system to replicate one or more logical storage volumes from the source storage system to the target storage system, but for the fact that target storage system responses to outbound replication messages generated by the source storage system are simulated through utilization of simulated target response generator 114 and pseudo IP links 116.

The outbound replication messages generated by the source storage system are substantially the same as those replication messages that would ordinarily be sent by the source storage system to a target storage system as part of the replication process, except that the outbound replication messages for which simulated target responses are to be generated by the simulated target response generator 114 are designated for transmission over a particular communication link of a particular type, illustratively one of the pseudo IP links 116. The pseudo IP links 116 are therefore utilized in the present embodiment to distinguish outbound replication messages for which simulated target responses are desired, from other outbound replication messages such as those directed to actual target storage systems in other replication processes carried out by the source storage system.

The replication process initiated in the storage system 105 is illustratively configured to replicate the production storage volumes 110 to corresponding recovery storage volumes of a target storage system.

For example, the replication process can comprise cycle-based asynchronous replication in which differential data derived from snapshots of the production storage volumes 110 of the source storage system is utilized to simulate updating of corresponding recovery storage volumes of the target storage system in each of a plurality of replication cycles.

As another example, the replication process can comprise synchronous replication in which host write operations directed to the production storage volumes 110 of the source storage system by one or more of the host devices 102 are mirrored to the corresponding recovery storage volumes of the target storage system in a simulated manner.

A given "replication process" as that term is broadly used herein may therefore include both asynchronous and synchronous replication modes of a multiple-mode replication process as well as support for concurrent operation of such modes and separate operation of the individual modes. The term "mode" as used herein in conjunction with asynchronous or synchronous replication may therefore itself comprise a corresponding asynchronous or synchronous replication process.

In conjunction with the replication process, the storage system 105 operating as a source storage system is configured to monitor outbound replication messages, and responsive to a given one of the replication messages being designated for transmission over a particular communication link of a predetermined type, to generate a simulated response from the target storage system to the given replication message based at least in part on one or more simulation parameters specified for the replication process. The storage system 105 operating as a source storage system processes the simulated response as if it were an actual response from the target storage system.

The replication process is illustratively configured to designate the production storage volumes 110 of the storage system 105 for replication to the target storage system. A given such production storage volume designated for replication by the storage system 105 illustratively comprises a set of one or more logical units (LUNs) or other logical storage volumes of the storage system 105. Each such logical storage volume comprises at least a portion of a physical storage space of one or more of the storage devices 106. Other arrangements of one or more storage volumes may be designated for replication as part of a given replication process in other embodiments.

As indicated previously, the particular communication link of a predetermined type illustratively comprises a pseudo link of the storage system 105, and more specifically comprises one of the pseudo IP links 116. A given such pseudo link of the storage system 105 does not have a corresponding route in a routing table of the source storage system and/or is not connected to a network port of the storage system 105. For example, the pseudo link can be configured as an otherwise normal IP link that does not create IP routes in the routing table and is not connected to any Ethernet port. Numerous alternative pseudo link arrangements may be used in other embodiments.

In some embodiments, the pseudo link is configured with a delay setting based at least in part on at least one of the one or more simulation parameters. For example, the delay setting of the pseudo link is illustratively determined as a function of at least a specified network round trip time (RTT) between the source and target storage systems and a specified target storage system processing time. More particularly, the delay setting in some embodiments is given by the sum of the network RTT and the target storage system processing time, although other functions of these and other simulation parameters may be used.

Additional or alternative simulation parameters may be used in establishing a delay setting for the pseudo link, including one or more of a recover point objective (RPO), a maximum bandwidth for the replication process, a deduplication factor for the production storage volumes 110 of the source storage system that are designated for replication, and a compression factor for the production storage volumes 110.

An example set of simulation parameters will be described in more detail below in conjunction with the illustrative embodiment of FIG. 3.

Other types of pseudo links may be used in place of the pseudo IP links 116 of illustrative embodiments, including various types of pseudo network connections, as well as combinations of various links of different network connection types, that may be utilized by the storage system 105 in conjunction with generating simulated target responses in an otherwise actual replication process.

In generating a simulated response from the target storage system to the given replication message based at least in part on one or more simulation parameters specified for the replication process, the simulated target response generator 114 illustratively generates the simulated response after a response delay determined based at least in part on the delay setting established for the corresponding one of the pseudo IP links 116. As noted above, the delay setting is illustratively established for at least one of the pseudo IP links 116 as a function of a network RTT and the target storage system processing time.

As a more specific example, generating the simulated response after a response delay determined based at least in part on a delay setting established for at least one of the pseudo IP links includes placing a message sending thread of the corresponding replication message into a sleep state for an amount of time based at least in part on the delay setting. The message sending thread then creates the simulated response in conjunction with exiting the sleep state. These and other operations relating to message sending threads are illustratively performed at least in part by the simulated target response generator 114 under the control of the replication control logic 112 within the storage controller 108.

The outbound replication messages in some embodiments comprise replication control commands and associated replication data to be transported from the source storage system to the target storage system over the network 104. In the present embodiment, just prior to sending such an outbound replication message, the source storage system checks to determine if the replication message is designated for transmission over one of the pseudo IP links 116. If the replication message is so designated, the replication is not actually sent but instead the message sending thread sleeps for amount of time given by the pseudo IP link delay setting. After the sleep period is over, the message sending thread automatically creates a "successful" response to the replication message and returns. Such simulated target responses are illustratively generated by the simulated target response generator 114 of the storage controller 108. Other simulated target response generation techniques can be used in other embodiments.

The storage system 105 is also configured in the present embodiment to generate one or more results of the replication process including at least an indication as to whether or not a particular RPO is achieved by the replication process. Additional or alternative results may be generated and presented or otherwise made available to one or more users of the system 100 in other embodiments.

The present embodiment and other embodiments described herein advantageously avoid the need to implement the replication process utilizing an actual target storage system with actual network bandwidth resources deployed between the source and target, and yet can nonetheless estimate with a high degree of accuracy the RPO or other benefits achievable by the replication process if it were carried out with the participation of an actual target storage system. The complexity and expense associated with reliably assessing multiple distinct replication scenarios for storage system 105 using actual production storage volumes 110 and their associated production applications is therefore considerably reduced. As a result, these embodiments are better able to configure an actual replication process in a manner that is able to achieve a desired RPO.

As a more particular illustration of the advantages of a given embodiment, assume that a storage administrator of the storage system 105 wants to replicate the production storage volumes 110 to a target storage system of a particular disaster recovery site. The storage administrator can execute the above-described replication process utilizing simulated target storage responses on the storage system 105 in order to determine information such as the amount of network bandwidth required between the storage system 105 and the target storage system at the disaster recovery site in order to achieve a desired RPO. The storage administrator can define the simulation parameters and execute the replication process to determine whether or not a particular amount of network bandwidth can achieve the desired RPO. Such an arrangement is simple and inexpensive for the storage administrator.

In addition, the replication process can be executed over a period of time sufficient to capture any temporal differences in the host write load of the production applications that utilize the storage volumes being replicated. For example, the production applications may generate peak amounts of data only at certain time of the day or week. Illustrative embodiments can be readily configured to capture such temporal variations.

The host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106, storage controller 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, one or more portions of the functionality for replication utilizing simulated target responses can be implemented in one or more host devices, or partially in a host device and partially in a storage system. Accordingly, illustrative embodiments are not limited to arrangements in which all such functionality is implemented in a storage system, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 2. The process as shown includes steps 200 through 212, and is suitable for use in system 100 but is more generally applicable to other types of information processing systems in which a storage system is configured to perform replication utilizing simulated target responses. The steps are illustratively performed at least in part under the control of the replication control logic 112 in the storage controller 108 of system 100, utilizing the simulated target response generator 114 and the pseudo IP links 116.

In step 200, a replication process is initiated in order to replicate a production storage volume of the source storage system to the target storage system. As indicated previously, the replication process is assumed to comprise at least one of a cycle-based asynchronous replication mode in which differential data derived from snapshots of the source storage volume is utilized to update the target storage volume in each of a plurality of replication cycles, and a synchronous replication mode in which host write operations directed to the source storage object are mirrored to the target storage object.

In some embodiments, the replication process may start in one of the modes and transition to the other mode, and then back again. For example, the replication process may start in an asynchronous replication mode and transition to a synchronous replication mode and vice-versa. Such replication modes may alternatively be implemented as respective separate replication processes.

In step 202, outbound replication messages of the replication process are monitored in the source storage system. As noted above, the outbound replication messages in some embodiments illustratively comprise replication control commands and associated replication data to be transported from the source storage system to the target storage system over a network that interconnects those systems, just as if the target storage system and network were actually deployed.

In step 204, a determination is made as to whether or not a replication message for a pseudo IP link has been detected. If such a replication message is detected, the process moves to step 206, and otherwise returns to step 202 as shown.

As indicated previously, a pseudo IP link is an example of what is more generally referred to herein as a "particular communication link of a predetermined type." A wide variety of alternative network connections or other types of links can be designated as particular communication links of a particular type for purposes of detecting outbound replication messages and generating simulated target responses to such detected messages as disclosed herein. For example, replication messages directed to one or more particular designated ports may be detected in alternative implementations of step 204. Such replication messages are also considered examples of replication messages designated for transmission over a particular communication link of a predetermined type.

The pseudo link is illustratively configured with a delay setting for use in step 206 below to generate a simulated response from the target storage system to the detected outbound replication message. The delay setting is illustratively based at least in part on one or more simulation parameters.

Other techniques may be used in other embodiments in order to determine whether or not a given detected replication message should result in generation of a simulated target response. A simulated target response generator of the type disclosed herein may therefore be configured to distinguish certain outbound replication messages for which simulated target responses should be generated from other outbound replication messages which are being sent to an actual target storage system. It is possible in some embodiments that these other techniques can include introducing one or more modifications to the outbound replication message content and/or format for those outbound replication messages for which simulated target responses are to be generated by the source storage system.

In step 206, a simulated response from the target storage system to the detected replication message is generated based at least in part on specified simulation parameters.

For example, generating a simulated response to the detected replication message in some embodiments comprises generating the simulated response after a response delay determined based at least in part on the above-noted delay setting established for the particular pseudo IP link for which the replication message was detected. The delay setting in some embodiments is given by the sum of the network RTT and the target storage system processing time, although other functions of these and other simulation parameters may be used.

An example set of simulation parameters 300 is illustrated in FIG. 3. In this example, it is assumed that at least a portion of the simulation parameters 300 are entered or otherwise defined by a storage administrator or other system user that is initiating execution of the replication process in the source storage system. The simulation parameters in this example more particularly include the following:

1. RPO—Desired recover point objective for replication process
2. Network RTT—Expected round trip network delay between source and target (e.g., obtained from network provider)
3. Target processing time:
   a. Average write latency of target
   b. Default average (e.g., 1 msec)
   c. Estimate for target array type (e.g., an XtremIO™ storage array)
4. Deduplication factor—Expected deduplication ratio for replicated data on the target:
   a. Source deduplication factor
   b. Deduplication factor of storage volumes being replicated (if available)
   c. Estimate for target array type (e.g., an XtremIO™ storage array)
5. Maximum bandwidth:
   a. Bandwidth of one or more new network connections to be set up for the replication process
   b. Maximum amount of bandwidth the replication data should consume in one or more existing network connections Again, these particular simulation parameters are only an example, and additional or alternative simulation parameters can be used in other embodiments. As mentioned previously, one or more of these simulation parameters, such as network RTT and target processing time, and possibly others, are utilized in generating the simulated target response to a given detected outbound replication message in step 206. Other ones of the simulation factors are utilized to control other aspects of the replication process. For example, generation of replication messages can be controlled at least in part based on certain simulation factors such as the specified maximum bandwidth.

The remainder of the FIG. 2 process will now be described.

In step 208, the simulated response of the target storage system is processed in the source storage system as if it were an actual response to the detected replication message from the target storage system.

In step 210, a determination is made as to whether or not the replication process is complete. If the replication process is not complete, the FIG. 2 process returns to step 202 as indicated in order to monitor additional outbound replication messages. Otherwise, the replication process is ended in step 212 and an indication is generated as to whether or not a desired recovery point objective was achieved.

One or more additional iterations through steps 206 and 208 are performed for respective additional replication messages directed to pseudo IP links, until such time as the replication process is complete in step 210 and ended in step 212.

Figure 2:
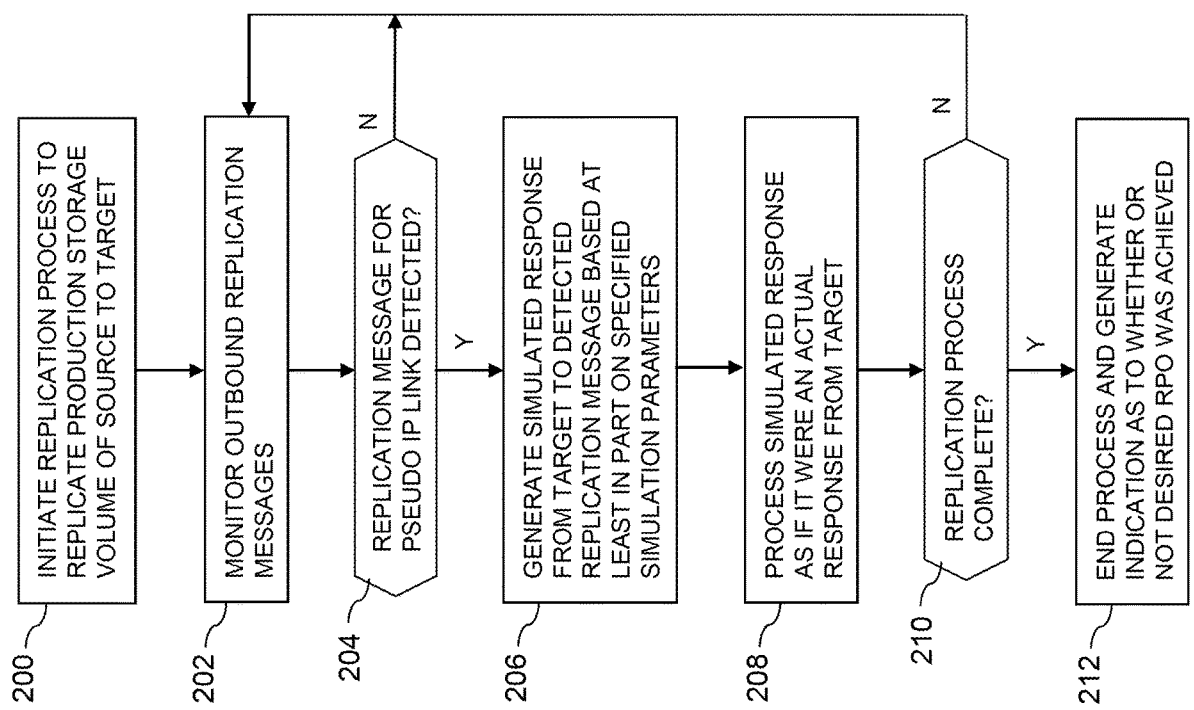
FIG. 2 is a flow diagram of a replication process utilizing simulated target responses in an illustrative embodiment.

In the FIG. 2 embodiment, the replication process may transition from asynchronous replication to synchronous replication, and vice-versa. During at least a portion of such a transition, the storage system may concurrently operate in both asynchronous and synchronous replication modes, possibly using controlled transition functionality as disclosed in U.S. patent application Ser. No. 15/819,666, filed Nov. 21, 2017 and entitled "Storage System Configured for Controlled Transition Between Asynchronous and Synchronous Replication Modes," which is incorporated by reference herein.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for performing replication utilizing simulated target responses. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different replication processes for respective different sets of one or more storage volumes or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 of storage system 105 that is configured to control performance of one or more steps of the FIG. 2 process in its corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate replication functionality utilizing simulated target responses as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of the storage system 105, and accordingly is assumed to be coupled to host devices 102 of computer system 101 via network 104 within information processing system 100.

The storage controller 408 in the present embodiment is configured to implement replication functionality utilizing simulated target responses as previously described in conjunction with FIGS. 1 through 3.

A particular portion 408' of the storage controller 408 illustratively includes distributed implementations of replication control logic 412, simulated target response generator 414 and pseudo IP links 416, which are configured to operate in a manner similar to that described above for respective corresponding modules 112, 114 and 116 of storage controller 108. The distributed implementations of replication control logic 412, simulated target response generator 414 and pseudo IP links 416 illustratively each comprise multiple instances of that particular module deployed on respective ones of a plurality of distributed processing modules of the storage controller 408.

Figure 4:
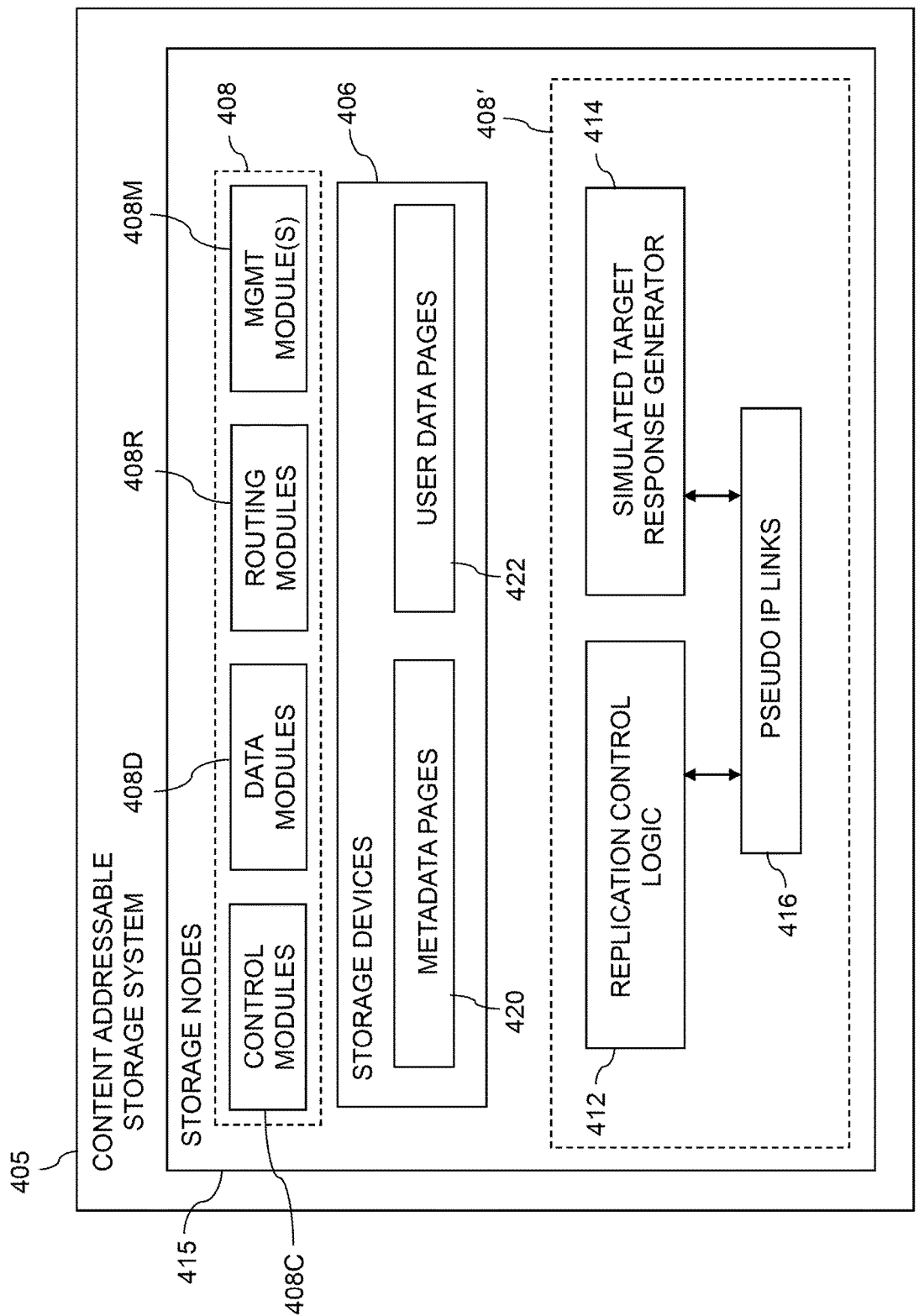
FIG. 4 shows an example of a content addressable storage system having a distributed storage controller for implementing a replication process utilizing simulated target responses in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP and Transmission Control Protocol (TCP). For example, respective sets of IP links used in data transfer and corresponding messaging could be associated with respective different ones of the routing modules 408R.

Although shown as separate modules in the particular portion 408' of the distributed storage controller 408, the modules 412, 414 and 416 in the present embodiment are assumed to be distributed at least in part over at least a subset of the modules 408C, 408D, 408R and 408M of the storage controller 408, as was indicated previously. Accordingly, at least portions of the replication functionality of the modules 412, 414 and 416 may be implemented in one or more of the other modules of the storage controller 408. In alternative embodiments, one or more of the modules 412, 414 and 416 may be implemented as respective stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 422 can include any type of user data that may be utilized in the system 100. The term "user data" herein is therefore also intended to be broadly construed.

A given set of logical storage volumes subject to replication utilizing modules 412, 414 and 416 illustratively comprises a set of LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The replication functionality provided by modules 412, 414 and 416 in this embodiment is assumed to be distributed across multiple distributed processing modules, including at least a subset of the processing modules 408C, 408D, 408R and 408M of the distributed storage controller 408.

For example, the management module 408M of the storage controller 408 may include replication control logic that engages corresponding replication control logic instances in all of the control modules 408C and routing modules 408R in order to implement at least portions of a replication process.

In some embodiments, the content addressable storage system 405 comprises an XtremIO™ storage array suitably modified to incorporate techniques for replication utilizing simulated target responses as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, replication functionality in some embodiments is implemented under the control of at least one system-wide management module of the distributed storage controller 408, utilizing the C-modules, D-modules and R-modules of the XtremIO™ storage array.

A given such system-wide management module can be configured to support one or more sets of additional application programming interface (API) commands relating to replication utilizing simulated target responses as disclosed herein.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device, illustratively one of the host devices 102. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement replication functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with replication functionality utilizing simulated target responses as disclosed herein can provide a number of significant advantages relative to conventional arrangements.

For example, some embodiments configure a storage system to operate as a source storage system in a replication process in which participation of a target storage system is simulated. One or more of these embodiments allow a particular source storage system and target storage system replication arrangement to be accurately and efficiently simulated without the need to allocate actual network bandwidth resources for the replication process and without the need for any additional storage system to operate as the target storage system relative to the source storage system.

Some embodiments substantially reduce the complexity and expense associated with reliably assessing multiple distinct replication scenarios for a given storage system using actual production applications and storage volumes.

Illustrative embodiments can be configured to generate highly accurate estimates of achievable RPOs under various prospective replication scenarios in a manner that does not consume excessive system resources.

For example, a storage administrator can determine the amount of network bandwidth that will be required between a production site storage system and a proposed recovery site storage system in order to achieve a particular RPO, without having to actually deploy any of the network resources or recovery site storage system resources.

Illustrative embodiments overcome the difficulties that would otherwise be associated with attempting to predict the network bandwidth required for replication. For example, conventional approaches fail to take into account factors such as deduplication ratio and compression ratio, which are difficult to predict unless real data is used.

Furthermore, some embodiments advantageously recognize that the amount of data generated by a production application can vary significantly over time. For example, there may be certain times during the day or week when more data is generated than at other times. In some embodiments, a replication process utilizing simulated target responses is configured to execute over a period of time sufficient to capture such temporal variations in amounts of data generated by production applications.

Moreover, illustrative embodiments utilize actual rather than simulated replication functionality of the source storage system, thereby ensuring that the actual effect of replication on the source storage system is adequately captured without committing to and configuring a network and storage system at the target site.

Accordingly, these embodiments are better able to determine a particular replication configuration that can achieve a desired RPO. This leads to improved replication implementation decisions and associated improvements in system performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with replication functionality utilizing simulated target responses will now be described in greater detail with reference to FIGS. 5 and 6. Although described in the context of system 100, these platforms may also be used to implement at least portions of other information processing systems in other embodiments.

Figure 5:
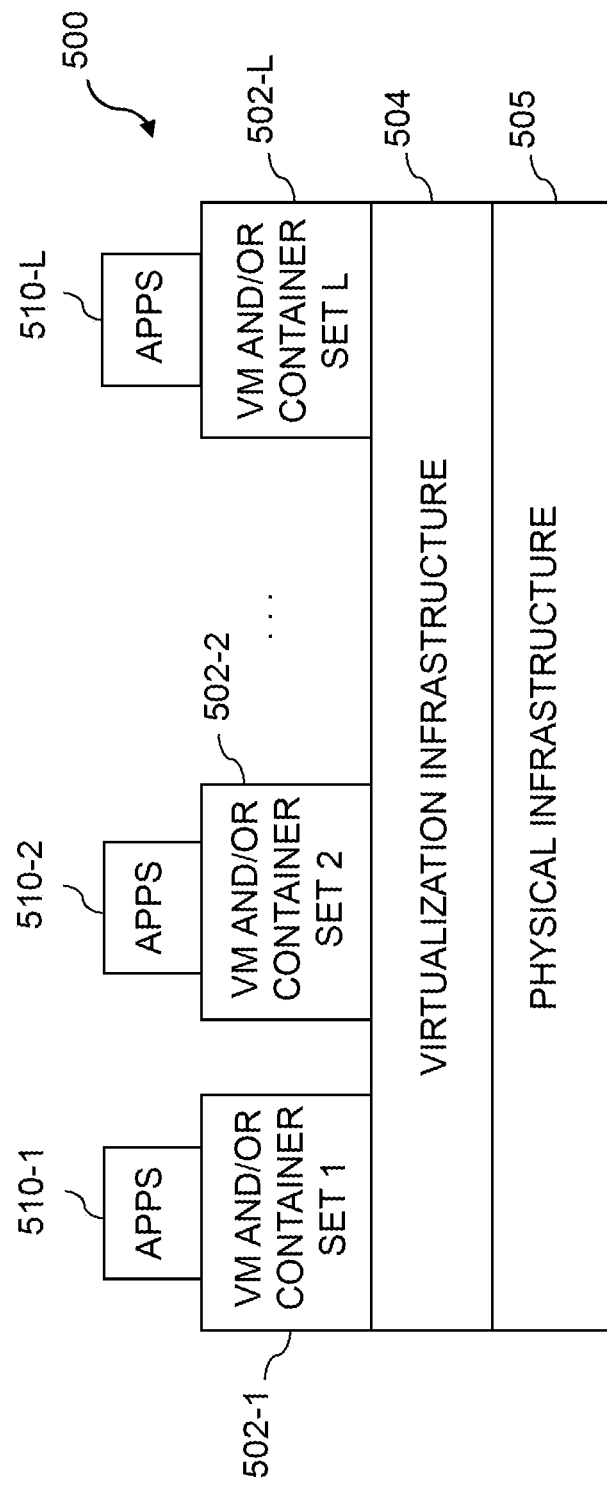
FIGS. 5 and 6 show examples of processing platforms that may be utilized to implement at least a portion of an information processing system in illustrative embodiments.
Figure 6:
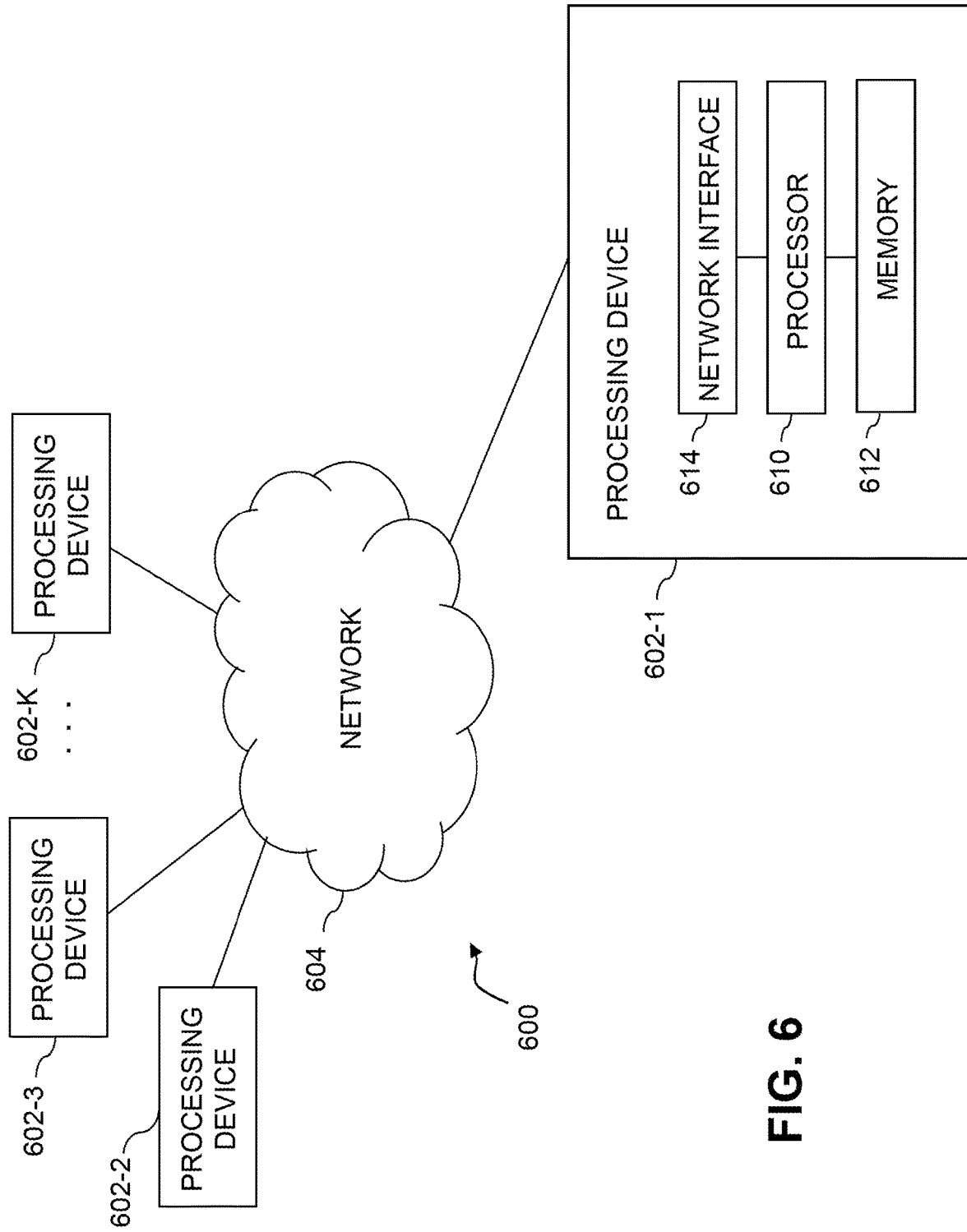

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can illustratively provide at least portions of replication functionality of the type described above. For example, one or more of the VMs can be configured to implement at least a portion of a storage controller and its associated replication control logic and other modules for providing replication functionality utilizing simulated target responses in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also illustratively provide at least portions of replication functionality of the type described above. For example, a container host device supporting multiple containers of one or more container sets can be configured to implement at least a portion of a storage controller and its associated replication control logic and other modules for providing replication functionality utilizing simulated target responses in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a graphics processing unit (GPU), or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the replication functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, replication control logic, simulated target response generators and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and a storage controller;
the storage system being configured to operate as a source storage system in a replication process in which participation of a target storage system is simulated;
in conjunction with the replication process, the source storage system being configured:
to monitor outbound replication messages;
responsive to a given one of the replication messages being designated for transmission over a particular communication link of a predetermined type, to generate a simulated response from the target storage system to the given replication message based at least in part on one or more simulation parameters specified for the replication process, the one or more simulation parameters comprising a first deduplication factor for one or more storage volumes of the source storage system that are designated for replication and a second deduplication factor estimated for the target storage system;
to process the simulated response as if it were an actual response from the target storage system;

wherein generating the simulated response from the target storage system to the given replication message based at least in part on the one or more simulation parameters specified for the replication process comprises generating the simulated response after a response delay determined based at least in part on the first deduplication factor and the second deduplication factor.

2. The apparatus of claim 1 wherein the replication process is configured to designate the one or more storage volumes of the source storage system for replication.

3. The apparatus of claim 1 wherein the particular communication link of a predetermined type comprises a pseudo link of the source storage system.

4. The apparatus of claim 3 wherein the pseudo link has at least one of the following properties:
the pseudo link does not have a corresponding route in a routing table of the source storage system; and
the pseudo link is not connected to a network port of the source storage system.

5. The apparatus of claim 3 wherein the pseudo link comprises a pseudo Internet Protocol link.

6. The apparatus of claim 3 wherein the pseudo link is configured with a delay setting based at least in part on at least one of the one or more simulation parameters.

7. The apparatus of claim 6 wherein the delay setting of the pseudo link is determined as a function of at least a specified network round trip time and a specified target storage system processing time.

8. The apparatus of claim 1 wherein the response delay is further determined based at least in part on a delay setting established for the particular communication link of the predetermined type.

9. The apparatus of claim 8 wherein the delay setting established for the particular communication link of the predetermined type is determined as a function of a network round trip time and a target storage system processing time.

10. The apparatus of claim 8 wherein generating the simulated response after the response delay determined based at least in part on the delay setting established for the particular communication link of the predetermined type comprises:
placing a message sending thread of the given replication message into a sleep state for an amount of time based at least in part on the delay setting;
the message sending thread being configured to create the simulated response in conjunction with exiting the sleep state.

11. The apparatus of claim 1 wherein the one or more simulation parameters specified for the replication process further comprise at least one of:
a recover point objective;
a network round trip time between the source and target storage systems;
a target storage system processing time; and
a maximum bandwidth for the replication process.

12. The apparatus of claim 1 wherein the one or more simulation parameters specified for the replication process further comprises:
a compression factor for the one or more storage volumes.

13. The apparatus of claim 1 wherein the source storage system is configured to generate one or more results of the replication process including at least an indication as to whether or not a particular recover point objective is achieved by the replication process.

14. The apparatus of claim 1 wherein the replication process comprises at least one of:

cycle-based asynchronous replication in which differential data derived from snapshots of one or more storage volumes of the source storage system is utilized to simulate updating of one or more storage volumes of the target storage system in each of a plurality of replication cycles; and
synchronous replication in which host write operations directed to the one or more storage volumes of the source storage system are mirrored to the one or more storage volumes of the target storage system in a simulated manner.

15. A method comprising:
configuring a storage system to operate as a source storage system in a replication process in which participation of a target storage system is simulated; and
in conjunction with the replication process, the source storage system:
monitoring outbound replication messages;
responsive to a given one of the replication messages being designated for transmission over a particular communication link of a predetermined type, generating a simulated response from the target storage system to the given replication message based at least in part on one or more simulation parameters specified for the replication process, the one or more simulation parameters comprising a first deduplication factor for one or more storage volumes of the source storage system that are designated for replication and a second deduplication factor estimated for the target storage system; and
processing the simulated response as if it were an actual response from the target storage system;
wherein generating the simulated response from the target storage system to the given replication message based at least in part on the one or more simulation parameters specified for the replication process comprises generating the simulated response after a response delay determined based at least in part on the first deduplication factor and the second deduplication factor; and
wherein the method is implemented by at least one processing device comprising a processor coupled to a memory.

16. The method of claim 15 wherein the particular communication link of a predetermined type comprises a pseudo link of the source storage system and wherein the pseudo link is configured with a delay setting for use in generating the simulated response from the target storage system, the delay setting being based at least in part on at least one of the one or more simulation parameters.

17. The method of claim 15 wherein the response delay is further determined based at least in part on a delay setting established for the particular communication link of the predetermined type.

18. A computer program product comprising a non-transitory processor-readable storage medium having stored therein program code of one or more software programs, wherein the program code when executed by at least one processing device causes said at least one processing device:
to configure a storage system to operate as a source storage system in a replication process in which participation of a target storage system is simulated; and
in conjunction with the replication process, to configure the source storage system:
to monitor outbound replication messages;
responsive to a given one of the replication messages being designated for transmission over a particular communication link of a predetermined type, to generate a simulated response from the target storage system to the given replication message based at least in part on one or more simulation parameters specified for the replication process, the one or more simulation parameters comprising a first deduplication factor for one or more storage volumes of the source storage system that are designated for replication and a second deduplication factor estimated for the target storage system; and to process the simulated response as if it were an actual response from the target storage system;

wherein generating the simulated response from the target storage system to the given replication message based at least in part on the one or more simulation parameters specified for the replication process comprises generating the simulated response after a response delay determined based at least in part on the first deduplication factor and the second deduplication factor.

19. The computer program product of claim 18 wherein the particular communication link of a predetermined type comprises a pseudo link of the source storage system and wherein the pseudo link is configured with a delay setting for use in generating the simulated response from the target storage system, the delay setting being based at least in part on at least one of the one or more simulation parameters.

20. The computer program product of claim 18 wherein the response delay is further determined based at least in part on a delay setting established for the particular communication link of the predetermined type.

* * * * *